(12) United States Patent
Bochen et al.

(10) Patent No.: US 7,806,244 B2
(45) Date of Patent: Oct. 5, 2010

(54) PISTON/CYLINDER UNIT WITH SOLENOID VALVE IN PISTON

(75) Inventors: Marian Bochen, Eitelborn (DE); Thomas Ehre, Koblenz (DE); Rainer Massmann, Bonn (DE); Rolf Mintgen, Thuer (DE)

(73) Assignee: Stabilus GmbH, Koblenz (DE)

( * ) Notice: Subject to any disclaimer, the term of this patent is extended or adjusted under 35 U.S.C. 154(b) by 317 days.

(21) Appl. No.: 12/011,147

(22) Filed: Jan. 24, 2008

(65) Prior Publication Data
US 2008/0245631 A1   Oct. 9, 2008

(30) Foreign Application Priority Data
Jan. 25, 2007   (DE) .................. 10 2007 003 707

(51) Int. Cl.
*F16F 9/12* (2006.01)
(52) U.S. Cl. ........................ 188/266; 188/267
(58) Field of Classification Search ............. 188/266.2, 188/266.6, 267, 267.2
See application file for complete search history.

(56) References Cited

U.S. PATENT DOCUMENTS

| | | | | |
|---|---|---|---|---|
| 4,958,704 A * | 9/1990 | Leiber et al. ................. | 188/285 |
| 5,090,770 A | 2/1992 | Heinrichs et al. | |
| 5,097,928 A | 3/1992 | Enders et al. | |
| 5,551,540 A * | 9/1996 | Forster et al. ............... | 188/267 |
| 5,551,541 A * | 9/1996 | Forster ........................ | 188/317 |
| 5,690,195 A * | 11/1997 | Kruckemeyer et al. ... | 188/282.5 |
| 5,878,850 A * | 3/1999 | Jensen ......................... | 188/267 |
| 6,390,252 B1 * | 5/2002 | Namuduri et al. ......... | 188/267.2 |
| 2006/0225976 A1 * | 10/2006 | Nakadate ..................... | 188/266 |
| 2006/0260891 A1 * | 11/2006 | Kruckemeyer et al. ... | 188/267.2 |

FOREIGN PATENT DOCUMENTS

| | | |
|---|---|---|
| DE | 1 554 216 | 3/1966 |
| DE | 17 53 847 | 3/1966 |
| DE | 82 18 079 | 6/1982 |
| DE | 38 07 913 | 3/1988 |
| DE | 39 13 849 | 4/1989 |
| DE | 39 34 960 | 10/1989 |
| DE | 40 03 959 | 2/1990 |
| DE | 41 03 861 | 2/1991 |
| DE | 42 43 837 | 12/1992 |
| DE | 43 34 007 | 4/1995 |
| DE | 103 51 794 | 6/2005 |

* cited by examiner

*Primary Examiner*—Christopher P Schwartz
(74) *Attorney, Agent, or Firm*—Cohen Pontani Lieberman & Pavane LLP

(57) ABSTRACT

A piston/cylinder unit includes a closed cylinder filled with a fluid under pressure, a piston dividing the cylinder into a first working chamber and a second working chamber, and a piston rod extending through the second working chamber. A passage through the piston connects the first working chamber to the second working chamber, and a valve closing member is movable between an open position and a closed position wherein the member closes the passage. A solenoid includes a coil, a coil core, and an armature in the piston, the armature driving the valve closing member between the closed position and the open position in response to a magnetic field produced by a current applied to the coil, the cylinder forming a magnetic field guide tube. The coil is supplied with current by a power line in the piston rod, and may be grounded to the piston rod or the cylinder.

18 Claims, 3 Drawing Sheets

PISTON/CYLINDER UNIT WITH SOLENOID VALVE IN PISTON

BACKGROUND OF THE INVENTION

1. Field of the Invention

The invention relates to a piston/cylinder unit having a closed cylinder which is filled with a fluid, which is under pressure, and whose interior space is divided into a first and a second working chamber by a piston which can be axially displaced in the cylinder, having a piston rod which is arranged at one end of the piston and is routed to the outside through the second working chamber and such that it is sealed off at one end face of the cylinder, it being possible to open and/or close a passage which leads from the first to the second working chamber by an electrically actuable solenoid valve.

2. Description of the Related Art

In a piston/cylinder unit of this type, it is known to arrange on the cylinder a solenoid valve by means of which a tripping pin can be movably actuated. The tripping pin can move a valve which is arranged in a partition wall of the cylinder out of its closed position and into its open position against a spring force. In the open position, the two working chambers of the cylinder are connected to one another at their mutually opposing ends by means of an annular channel. This annular channel is formed between the cylinder and a tube which surrounds the cylinder at a radial distance. This design not only has a large number of parts but also requires a large installation space.

SUMMARY OF THE INVENTION

The object of the invention is therefore to provide a piston/cylinder unit of the type mentioned in the introduction which requires little installation space and comprises a small number of simple components.

According to the invention, this object is achieved by forming the passage and the solenoid valve in the piston. The passage can be closed by a valve-closing member which can be movably driven between a closed position and an open position and forms an armature or is connected to an armature. A coil to which current can be applied is fixed in the piston, and a coil core is arranged axially with respect to the movement direction of the armature, and/or is surrounded by a magnetic-field guide tube.

On account of this design, a compact construction can be achieved and complicated connection of the two working chambers outside the cylinder can be dispensed with.

A slim construction is achieved if the valve-closing member can be movably driven between the closed position and the open position axially in the cylinder and the coil is arranged axially in the cylinder.

Concentrated guidance of the field lines of the magnetic field and therefore strengthening of the magnetic field acting on the armature is achieved if a steel disc which extends radially to a point close to the magnetic-field guide tube is arranged on that end region of the coil core which protrudes out of the coil and is averted from the armature.

The elements which generate the magnetic field and therefore the entire piston/cylinder unit can consequently be designed with a smaller overall size when actuating forces are high.

A separate magnetic-field guide tube can be dispensed with if the cylinder forms the magnetic-field guide tube, which results in a strong field flux.

Concentrated guidance of the field lines of the magnetic field is likewise achieved if the armature extends radially to a point close to the magnetic-field guide tube.

In order to reduce the number of components, the coil core can be integrally formed with the piston rod.

However, it is also possible for the coil core and the piston rod to be formed in two parts and to be coaxially connected to one another, with the said coil core and the piston rod being connected to one another by a screw connection for the purpose of simple mounting.

In order to achieve a compact construction while at the same time avoiding conductive contact between the coil and the coil core, a coil carrier which is composed of an insulating material, in particular of a plastic, can be fixed on the coil core so as to surround the coil core, in which coil carrier the coil is arranged.

In order to prevent leakage at the closed valve, the valve-closing element is preferably an elastomeric part which is fixedly connected to the armature.

A simple construction which requires small radial dimensions is provided by the passage being coaxially formed in a circular-cylindrical piston part and, with its armature-end mouth, forming a valve seat, with the circular-cylindrical piston part preferably being guided in the cylinder in an axially displaceable manner.

To this end, the circular-cylindrical piston part can simply have one or more guide rings which radially circle on its radially encircling casing surface and with which the piston part is guided in an axially displaceable manner in the cylinder, with the guide rings preferably being composed of an electrically insulating material.

It is necessary to form the guide rings from an electrically insulating material if the piston rod is composed of an electrically conductive material.

In order to separate the two working chambers from one another in a sealed manner, a sealing ring, which bears against the inner wall of the cylinder with its outer radially encircling ring face, can be arranged in an annular groove which is formed on the radially encircling casing surface of the circular-cylindrical piston part.

In order to strengthen the magnetic field, the circular-cylindrical piston part can be composed of a paramagnetic material.

Reliable closing of the valve opening is achieved if the armature is displaceably guided in its movement direction on one or more guide elements of the piston, it being possible to arrange the guide elements on the circular-cylindrical piston part.

The guide elements can be pins which extend in the axial direction, are arranged in a uniformly distributed manner in a concentric circle and on which the disc-like armature with correspondingly formed axial holes is displaceably guided, so that the armature is guided to a point close to the magnetic-field guide tube.

The circular-cylindrical piston part can be connected to the coil core or to the piston rod, it being possible to fixedly arrange a fixing element, which is connected to the free ends of the guide elements, on that end of the coil core or of the piston rod which faces the armature.

The fixing element and also the guide elements can be composed of a paramagnetic material.

In this case, the fixing element can be a ring-like disc.

A spring force is preferably applied to the armature or the valve-closing member in its closed position and a magnetic force can be applied to the armature or valve closing member in the opening direction by current being applied to the coil.

To this end, a compression spring which is supported on the piston can bear against the armature or the valve-closing member with prestress, it being possible for the compression spring to be a spring ring in order to save installation space.

A simple way of providing a power supply and/or a ground connection to the coil involves a power-supply line and/or a ground line being routed to the coil from the outside through the tubular piston rod.

However, a power supply or a ground connection can also be provided via the piston rod itself which then forms a power-supply line or a ground line and is connected to the coil and may have to be insulated from the piston and the cylinder.

As an alternative to this, it may be possible to dispense with a separate power-supply line or a separate ground line if the piston rod forms a power-supply line or ground line and is connected to the coil.

If a power supply to the coil is controlled by an, in particular electronic, control system, it is therefore also possible to control the extension speed of the piston and piston rod. This may be performed, for example, by pulse-width modulation.

The cylinder can be connected in an articulated manner to a fixed component and the free end of the piston rod can be connected in an articulated manner to a movable component of a motor vehicle.

It goes without saying that a kinematically reversed articulated connection is equally possible.

In this case, the movable component may be a flap which can pivot about a pivot shaft and can be movably driven in the opening direction by the piston/cylinder unit when the solenoid valve is open. The flap remains in the position just assumed as a result of the solenoid valve being closed.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
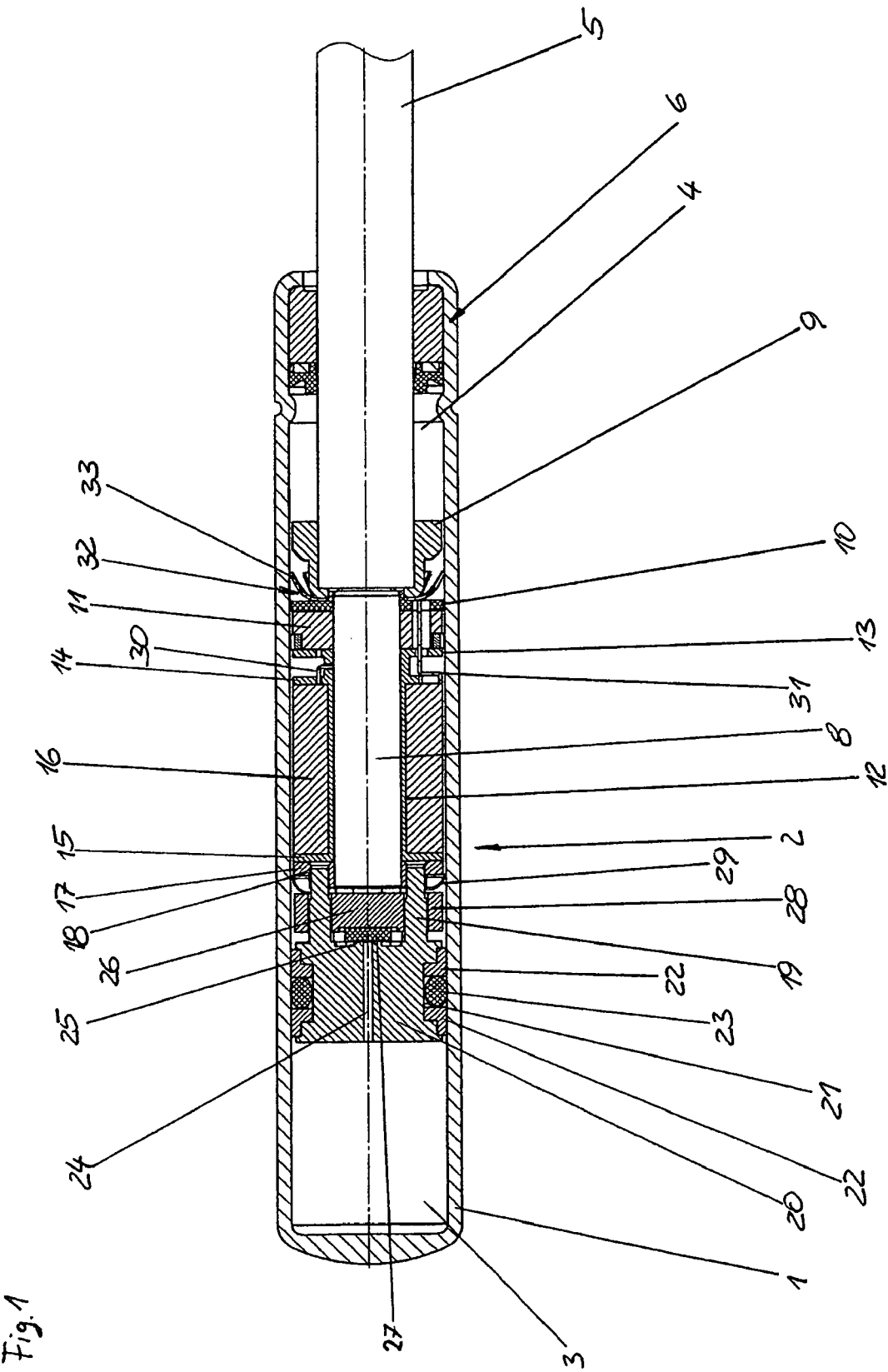
FIG. 1 shows a first exemplary embodiment of a piston/cylinder unit in partial cross section.

The piston/cylinder units which are illustrated in the figures have a cylinder 1 which is filled with a fluid, which is under pressure, in particular with gas, forms a magnetic-field guide tube and whose interior is divided into a first working chamber 3 and a second working chamber by a piston 2 which can be axially displaced in the cylinder 1.

A piston rod 5 is fixed at one end of the piston 2 and is routed to the outside through the second working chamber 4 and such that it is sealed off by a sealing and guide assembly 6 at one end face of the cylinder 1.

That end of the piston rod 5 which protrudes into the cylinder 1 is provided with a coaxial threaded hole 7 into which a bolt-like coil core 8 which has a smaller diameter than the piston 5 is screwed with its end which is provided with a thread, so that the coil core forms a coaxial extension of the piston rod 5. It goes without saying the other connection options, for example welding, are also possible.

A spacer disc 9 which is composed of an electrically insulating material and surrounds the piston-rod end radially to the inside is plugged onto that end of the piston rod 5 which protrudes into the cylinder 1. An insulating ring 10 is arranged on the coil core 8 such that it bears axially against the spacer disc 9, and an annular steel disc 11 which extends radially outwards to a point close to the inner wall of the cylinder 1 in turn bears axially against the insulating ring 10.

A coil carrier 12 which surrounds the coil core 8, is composed of an electrically insulating material, for example plastic, and has a radial flange 13 which bears axially against the disc 11. The coil carrier 12 is arranged on the coil core 8 on that side of the disc 11 which is opposite from the insulating ring 10.

A coil 16 to which current can be applied is arranged between two further radial flanges 14 and 15 of the coil carrier 12.

A circular disc 17 which is composed of a paramagnetic material, bears axially against the coil carrier 12 opposite from the piston rod 5.

The circular disc 17, which extends radially to a point close to the inner wall of the cylinder 1, is formed with continuous axial openings 18 which are uniformly distributed in a concentric circle. The free ends, which correspond to axially extending pins 19, of a circular-cylindrical piston part 20, which is composed of a paramagnetic material, protrude into the openings 18 and are fixed. The piston part 20 is guided in the cylinder 1 in an axially displaceable manner and has a circumferential channel 21.

Two electrically non-conductive guide rings 22 are inserted into the channel 21 at the two axial ends such that they bear radially against the inner wall of the cylinder 1, in order to axially guide the piston part 20.

A sealing ring 23 which bears against the inner wall of the cylinder 1 is inserted in the space between the two guide rings 22 and thus seals off the two working chambers 3 and 4 from one another.

A coaxially continuous passage 24, whose mouth which faces the coil core 8 forms a valve seat 25, is formed in the piston part 20.

A disc-like armature 26 carries, on its side which faces the valve seat 25, an elastomeric valve member 27 by which the passage 24 is closed. The armature 26 Is arranged with axial play between the end face of the piston part 20, from which the pins 19 axially protrude, and the coil core 8.

The disc-like armature 26 which extends radially to a point close to the inner wall of the cylinder 1 has holes 28 which receive the pins 19 and through which the pins 19 protrude.

The armature 26 is therefore guided on the pins 19 in an axially displaceable manner.

The armature 26 is spring-loaded, by way of its valve-closing element 27, axially against the valve seat 25 by a prestressed compression spring in the form of a spring ring 29 which is supported on the circular disc 17.

Figure 3:
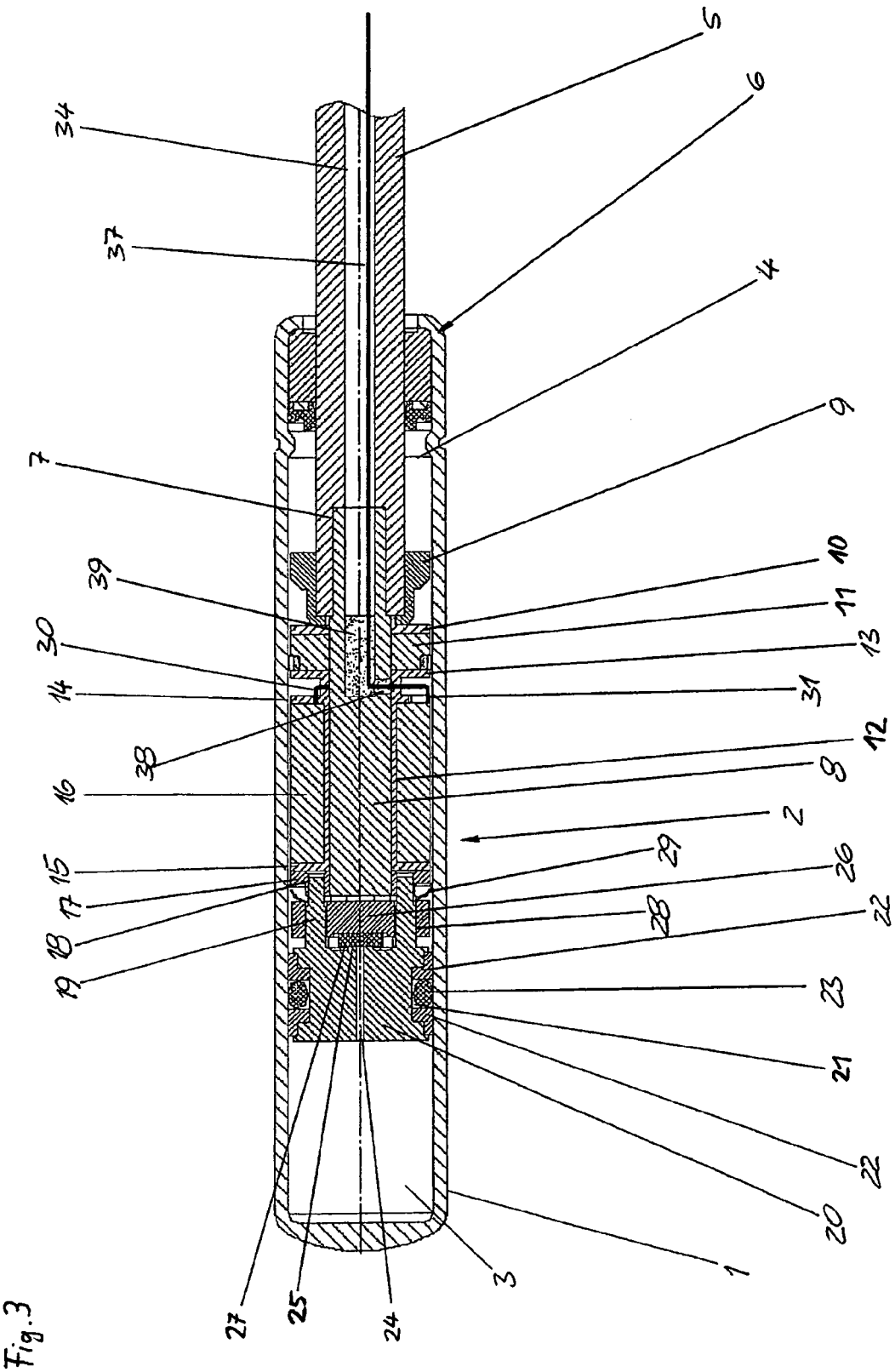
FIG. 3 shows a third exemplary embodiment of a piston/cylinder unit in cross section.

In the exemplary embodiment of FIGS. 1 and 3, power is supplied to the first coil end 30 of the coil 16 from the outside by means of the piston rod 5.

In FIG. 1, the second coil end 31 of the coil 16 leads to an annular sliding contact 32 which is clamped-in axially between the spacer disc 9 and the insulating ring 10. By way of approximately radially outwardly protruding spring arms 33, the contact 32 bears against the inner wall of the earth-conducting cylinder 1.

Figure 2:
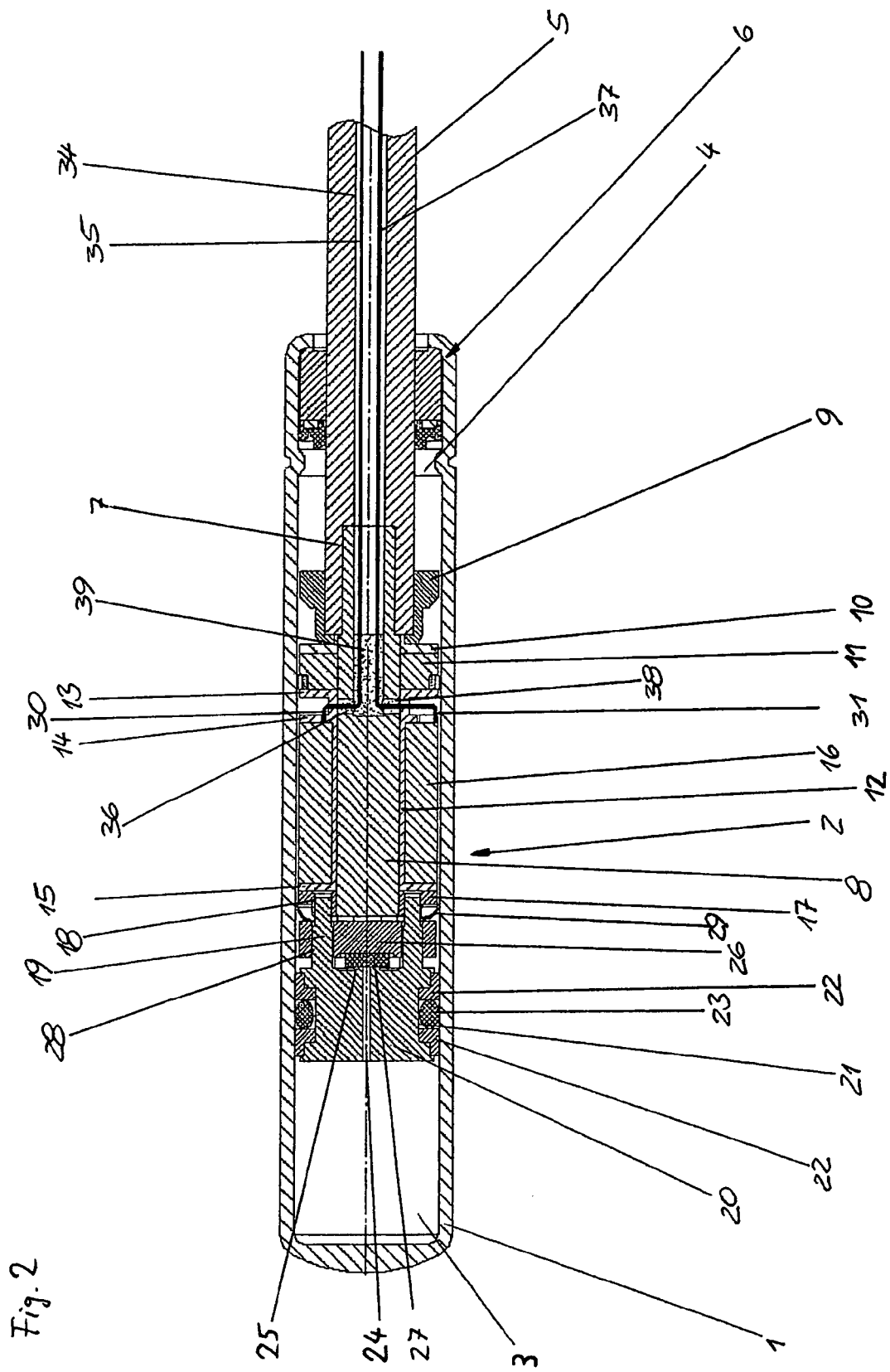
FIG. 2 shows a second exemplary embodiment of a piston/cylinder unit in cross section.

In FIGS. 2 and 3, the piston rod 5 and that end of the coil core 8 which reaches as far as the coil 16 are formed in a tubular manner with a passage opening 34 through which a power-supply line 35 is routed from the outside. This power-supply line is routed through a first radial opening 36 in the coil core to the coil carrier 12 and is connected to the first coil end 30 of the coil 16.

In FIG. 2, an earth line 37 is furthermore routed from the outside through the passage opening 34 and a second radial opening 38 in the coil core 8 to the coil carrier 12 and connected to the second coil end 31 of the coil 16.

In this case, both in FIG. 2 and in FIG. 3, the passage opening 34 is filled by the injection of an insulating material 39 in the region of the radial openings 36 and 38 and therefore closed.

When current is not applied to the coil 16, the armature 26 holds the valve-closing member 27 by means of the spring ring 29 such that it bears against the valve seat, and therefore closes the passage 24 which connects the two working chambers 3 and 4 to one another.

If current is applied to the coil 16, it generates a magnetic field by means of which the armature 26 is drawn towards the coil core 8 against the force of the spring ring 29 and the valve-closing member 27 is therefore lifted away from the valve seat 25, so that gas can flow from one working chamber 3 or 4 to the other working chamber 4 or 3.

A concentrated magnetic flux is achieved by guidance of the magnetic-field lines through the coil core 8, the disc 11, the cylinder 1 and back to the coil core 8 by means of the armature 26.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A piston/cylinder unit comprising:
   a closed cylinder filled with a fluid under pressure;
   a piston dividing the cylinder into a first working space and a second working space, the piston being connected to a piston rod extending through the second working chamber;
   a passage through the piston connecting the first working chamber to the second working chamber;
   a valve closing member movable between an open position and a closed position wherein said member closes said passage;
   a solenoid comprising a coil, a coil core, and an armature in said piston, said armature driving said valve closing member between said closed position and said open position in response to a magnetic field produced by a current applied to said coil, said cylinder forming a magnetic field guide tube, wherein the coil core extends out of the coil to an end opposite from said armature, the unit further comprising a steel disc surrounding the coil core between the coil and the end, the disc extending radially to a point close to the cylinder.

2. The piston/cylinder unit of claim 1 wherein the piston comprises a cylindrical piston part which moves axially in said cylinder, said passage extending coaxially through said piston part to a valve seat facing said armature.

3. The piston/cylinder unit of claim 2 wherein the piston part comprises at least one guide element on which the armature is guided.

4. The piston/cylinder unit of claim 3 further comprising a fixing element fixed between the coil core and the at least one guide element.

5. The piston/cylinder unit of claim 4 wherein the fixing element is made of a paramagnetic material.

6. The piston/cylinder unit of claim 2 wherein said piston part is surrounded by at least one electrically insulating guide ring which guides said piston part axially in said cylinder.

7. The piston/cylinder unit of claim 2 wherein the piston part is made of paramagnetic material.

8. The piston/cylinder unit of claim 1 wherein in piston rod has an axial bore, the unit further comprising a power supply line routed to the coil through the bore.

9. The piston/cylinder unit of claim 8 wherein the piston rod forms a ground line.

10. The piston/cylinder unit of claim 8 further comprising a sliding contact connecting the coil to the cylinder, whereby the cylinder forms a ground line.

11. The piston/cylinder unit of claim 1 wherein the armature extends radially to a point close to the magnetic field guide tube.

12. The piston/cylinder unit of claim 1 wherein the coil core is formed in one piece with the piston rod.

13. The piston/cylinder unit of claim 1 wherein the coil core extends into the piston rod and is fixed to the piston rod.

14. The piston/cylinder unit of claim 1 further comprising an insulating coil carrier surrounding the coil core, the coil being arranged on the coil carrier.

15. The piston/cylinder unit of claim 1 wherein the valve closing member is an elastomeric part which is fixed to the armature.

16. A piston/cylinder unit comprising:
   a closed cylinder filled with a fluid under pressure;
   a piston dividing the cylinder into a first working space and a second working space, the piston being connected to a piston rod extending through the second working chamber;
   a passage through the piston connecting the first working chamber to the second working chamber;
   a valve closing member movable between an open position and a closed position wherein said member closes said passage;
   a solenoid comprising a coil, a coil core, and an armature in said piston, said armature driving said valve closing member between said closed position and said open position in response to a magnetic field produced by a current applied to said coil, said cylinder forming a magnetic field guide tube,
   wherein the piston comprises a cylindrical piston part which moves axially in said cylinder, said passage extending coaxially through said piston part to a valve seat facing said armature wherein said piston part is surrounded by two electrically insulating guide rings which guide said piston part axially in said cylinder; and a sealing ring between said guide rings and contacting said cylinder.

17. A piston/cylinder unit comprising:

a closed cylinder filled with a fluid under pressure;

a piston dividing the cylinder into a first working space and a second working space, the piston being connected to a piston rod extending through the second working chamber;

a passage through the piston connecting the first working chamber to the second working chamber;

a valve closing member movable between an open position and a closed position wherein said member closes said passage;

a solenoid comprising a coil, a coil core, and an armature in said piston, said armature driving said valve closing member between said closed position and said open position in response to a magnetic field produced by a current applied to said coil, said cylinder forming a magnetic field guide tube, wherein the piston comprises a cylindrical piston part which moves axially in said cylinder, said passage extending coaxially through said piston part to a valve seat facing said armature, the piston part comprises at least one guide element on which the armature is guided, and wherein said piston part comprises a plurality of axially extending pins arranged in a circle, said armature having a plurality of holes which receive said pins.

18. A piston/cylinder unit comprising:

a closed cylinder filled with a fluid under pressure;

a piston dividing the cylinder into a first working space and a second working space, the piston being connected to a piston rod extending through the second working chamber;

a passage through the piston connecting the first working chamber to the second working chamber;

a valve closing member movable between an open position and a closed position wherein said member closes said passage;

a solenoid comprising a coil, a coil core, and an armature in said piston, said armature driving said valve closing member between said closed position and said open position in response to a magnetic field produced by a current applied to said coil, said cylinder forming a magnetic field guide tube; and a compression spring between the piston and the armature, the compression spring loading the valve member toward a closed position.

* * * * *